US009336257B2

(12) United States Patent
Forster et al.

(10) Patent No.: US 9,336,257 B2
(45) Date of Patent: May 10, 2016

(54) SYSTEMS AND METHODS PROVIDING A SOFT EXIT STATE FOR SECONDARY BUSINESS OBJECTS LOCKS

(75) Inventors: Robert Forster, Viechtach (DE); Sirvathsan Govindarajan, Munich (DE)

(73) Assignee: SAP SE, Walldorf (DE)

( * ) Notice: Subject to any disclaimer, the term of this patent is extended or adjusted under 35 U.S.C. 154(b) by 858 days.

(21) Appl. No.: 12/938,634

(22) Filed: Nov. 3, 2010

(65) Prior Publication Data

US 2012/0109920 A1 May 3, 2012

(51) Int. Cl.
*G06F 7/00* (2006.01)
*G06F 17/30* (2006.01)

(52) U.S. Cl.
CPC .... *G06F 17/30362* (2013.01); *G06F 17/30171* (2013.01)

(58) Field of Classification Search
CPC .................................... G06F 17/30171
USPC .................................... 707/756
See application file for complete search history.

(56) References Cited

U.S. PATENT DOCUMENTS

2004/0148589 A1* 7/2004 Conrad et al. ................ 717/116
2008/0140601 A1* 6/2008 Mital et al. ...................... 706/48
2009/0063488 A1* 3/2009 Daum et al. ...................... 707/8

OTHER PUBLICATIONS

Heiko Schuldt, “Process Locking: A Protocol based on Ordered Shared Locks for the Execution of Transactional Processes”, 2001 ACM Trans database System, 1-58113-361-8/01/05, PODS’01, (pp. 289-300, 12 total pages).
Vigyan Singhal and Alan Jay Smith, “Analysis of locking behavior in three real database systems”, The VLDB Journal (1997) 6, copyright Springer-Verlag 1997, 13pgs.
Geert Monsieur et al., “Handling Transactional Business Services”, PLoP ’08, Oct. 18-20, 2008, Copyright 2008, ACM 978-1-60558-151-4, 8pgs.

* cited by examiner

*Primary Examiner* — Ajith Jacob
(74) *Attorney, Agent, or Firm* — Buckley, Maschoff & Talwalkar LLC

(57) ABSTRACT

According to some embodiments, a primary business object $BO_A$ is established along with a plurality of secondary business objects that depend from the primary business object $BO_A$ in a hierarchy. The primary business object $BO_A$ may place a lock on a secondary business object $BO_B$ and facilitate an update of data associated with the secondary business object $BO_B$. The secondary business object $BO_B$ may then detect when a database commit has been executed, responsive to that detection, the secondary business object $BO_B$ may remove the lock associated with the secondary business object $BO_B$.

21 Claims, 6 Drawing Sheets

SYSTEMS AND METHODS PROVIDING A SOFT EXIT STATE FOR SECONDARY BUSINESS OBJECTS LOCKS

FIELD

Some embodiments relate to business objects. More specifically, some embodiments are associated with a soft exit state for secondary business object locks.

BACKGROUND

An enterprise may store and process information using "business objects." As used herein, the phrase "business object" may refer to, for example, a software entity representing real-world items used during the transaction of business. For example, a business object may represent a business document such as a sales order, a purchase order, or an invoice. Note that one business object may receive information from (or provide information to) other business objects. For example, when an "order quantity" in a purchase order business object is modified, an "amount due" in an associated invoice business object may be automatically updated.

A business object may be stored in a storage device, such as by storing information in a database table on a hard disk drive. At times, the business object may be loaded into memory (e.g., server memory) and manipulated as appropriate by a processor. When finished, the processor may store the updated business object back into the storage device using a "database commit." Note that a single business object may potentially be updated by more than one other business object. As a result, updates to a business object may need to be managed and/or coordinated. That is, when a business object is being used and/or modified during a transaction, it may be important to prevent other business objects from accessing or modifying that business object until the transaction is complete.

To facilitate such coordination, a business object may be "locked" to prevent other business objects from accessing or modifying that business object while it is being updated (or potentially updated). In this way, information associated with the locked business object can be updated without interference from other business objects. Note that locking too many business objects (and/or for too long a period of time relative to the transaction) may unnecessarily prevent that business object from being used degrade the performance of the system. Locking too few business objects (and/or for too short a period of time relative to the transaction) may result in errors when a business object is simultaneously accessed by multiple parties. Moreover, the processing time and logic required to track the lock/unlock status associated multiple business objects can be substantial and difficult to program. This may be especially true when hundreds of business objects need to be considered.

Accordingly, systems and methods to automatically and efficiently handle how locks are placed on and/or removed from business objects may be provided in association with some embodiments described herein.

DETAILED DESCRIPTION

An enterprise may store and process information using "business objects." As used herein, the phrase "business object" may refer to, for example, a software entity representing real-world items used during the transaction of business. For example, a business object may represent a business document such as a sales order, a purchase order, or an invoice. A business object may also represent items such as a product, a business partner, or a piece of equipment.

A business object may include business logic and/or data having any suitable structure. The structure of a business object may be determined based on the requirements of a business scenario in which the business object is to be deployed. A business solution for a particular business scenario may include many business objects, where the structure of each business object has been determined based on the requirements of the particular business scenario.

Figure 1:
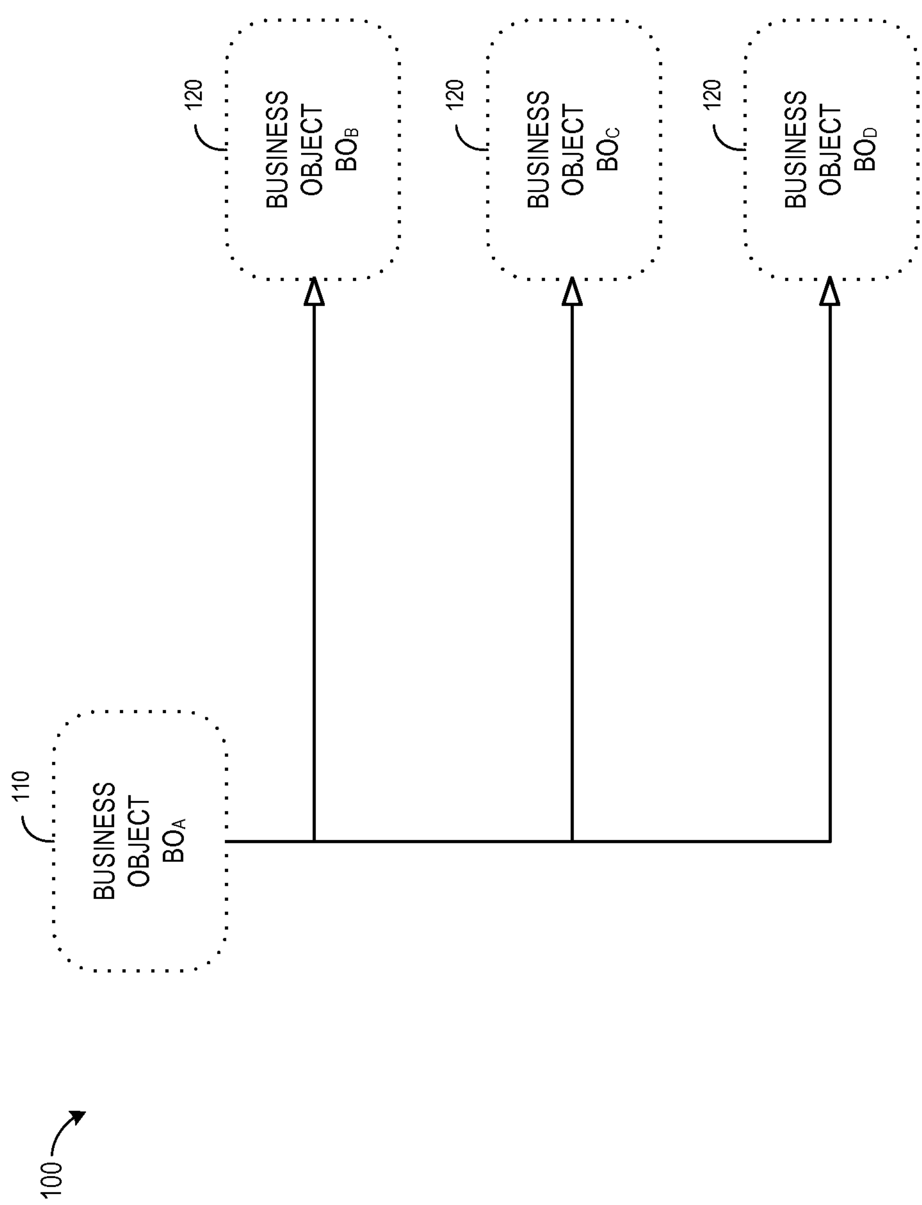
FIG. 1 is an illustration of a business object hierarchy.

Note that one business object may receive information from or provide information to other business objects. For example, when an "order quantity" in a purchase order business object is modified, an "amount due" in an associated invoice business object may be automatically updated. Moreover, in some cases, business objects may have predefined relationships with each other. FIG. 1 is an illustration of a business object hierarchy 100. In this example, a parent or primary business object 110 ($BO_A$) is associated with a number of child or secondary business objects 120 ($BO_B$ through $BO_D$). The secondary business objects 120 might be associated with, for example, items that will potentially need to be updated when there is a change to the primary business object 110.

A business object may be stored in a storage device, such as by storing information in a database table on a hard disk drive. At times, the business object may be loaded into memory (e.g., server memory) and manipulated as appropriate by a processor. When finished, the processor may store the updated business object back into the storage device using a "database commit." Note that a single business object may potentially be updated by more than one other business object. As a result, updates to a business object may need to be managed and/or coordinated. That is, when $BO_A$ of FIG. 1 is updating $BO_B$ through $BO_D$ during a transaction, it may be important to prevent other business objects from accessing or modifying those business objects until $BO_A$ completes the transaction.

Figure 2:
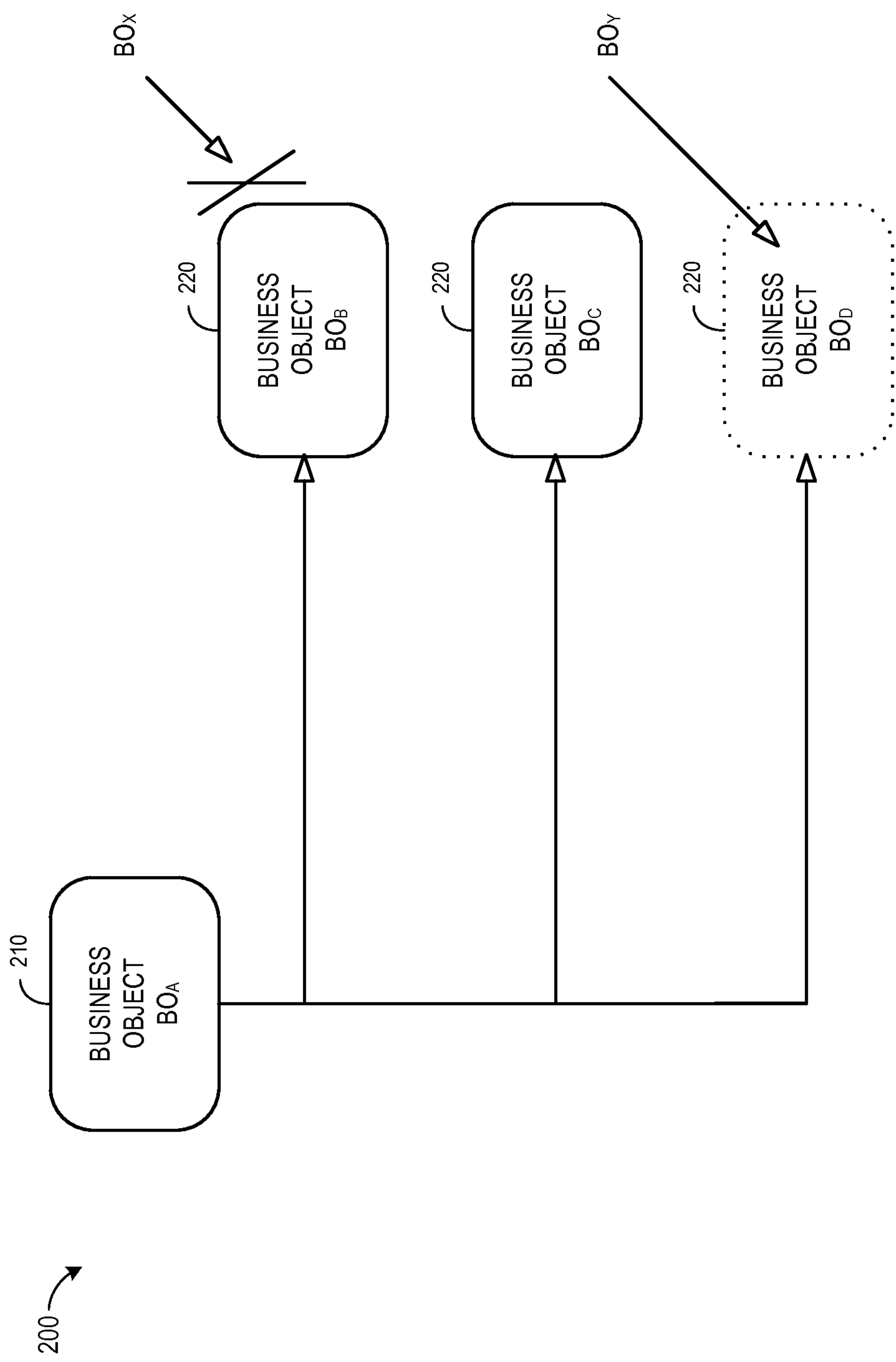
FIG. 2 is an illustration of a business object hierarchy implementing a locking mechanism.

To facilitate such coordination, a business object may be "locked" to prevent other business objects from accessing or modifying that business object while it is being updated (or potentially updated). FIG. 2 is an illustration of business object hierarchy 200 implementing a locking mechanism. In particular, a primary business object 210 ($BO_A$) is locked (illustrated by a solid line in FIG. 2) and has decided to lock two secondary business objects 220 ($BO_B$ and $BO_C$) while leaving another secondary business object 220 unlocked ($BO_D$). In this way, $BO_A$ can update information associated with $BO_B$ and $BO_C$ without interference from other business objects. That is, another $BO_X$ will be denied access to $BO_B$ and $BO_C$. In this example, $BO_Y$ would still be free to access $BO_D$ (because $BO_D$ is not locked). When $BO_A$ completes the transaction, locks may be removed from all of the business objects.

Note that locking too many business objects (and/or for too long a period of time relative to the transaction) may unnecessarily prevent other business objects from using that information and degrade the performance of the system. Locking too few business objects (and/or for too short a period of time relative to the transaction) may result in errors when multiple business objects are simultaneously trying to retrieve information from and/or store information into the same business object. Moreover, the processing time and logic required for the primary business object 210 to track the lock/unlock status associated with each secondary business object 220 can be substantial and difficult to program. This may be especially true when hundreds of secondary business objects need to be considered (and when each secondary business object may be related to multiple primary business objects). Thus, improved systems and methods associated with business object locking may be desired.

Figure 3:
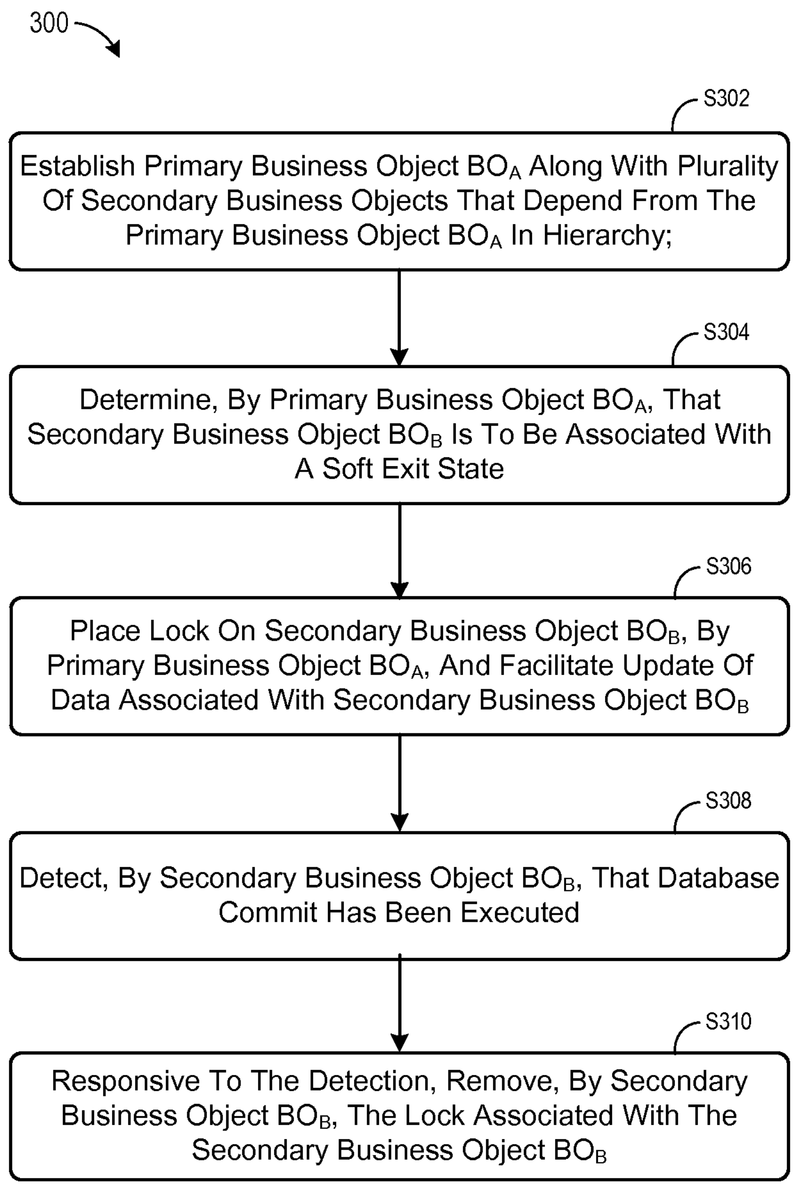
FIG. 3 is a flow diagram of a process in accordance with some embodiments.

To facilitate an efficient implementation of business object locks, according to some embodiments a business object may be placed into a "soft exit" state when locked. For example, FIG. 3 is a flow diagram of a process 300 in accordance with some embodiments. Note that all processes described herein may be executed by any combination of hardware and/or software. The processes may be embodied in program code stored on a tangible medium and executable by a computer to provide the functions described herein. Further note that the flow charts described herein do not imply a fixed order to the steps, and embodiments of the present invention may be practiced in any order that is practicable.

At S302, a primary business object $BO_A$ may be established along with a plurality of secondary business objects that depend from the primary business object $BO_A$ in a hierarchy. The business objects may, for example, represent objects in the real world, such as a purchase order or business process. According to some embodiments, the hierarchy is associated with line items between the primary business object $BO_A$ and the secondary business objects. Note that a single secondary business object might be associated with several primary business objects.

At S304, it may be determined by the primary business object $BO_A$ that a secondary business object $BO_B$ is to be associated with a soft exit state. As used herein, the phrase "soft exit state" might indicate that a locked business object will wait for an occurrence of a database commit (e.g., by the primary business object). When the locked business object detects that a database commit has occurred, it automatically removes the lock from itself (instead of requiring that the primary business object remove the lock). Such an approach may, according to some embodiments, simplify the amount of processing that needs to be performed by the primary business object.

At S306, the primary business object $BO_A$ places a lock on the secondary business object $BO_B$. The primary business object $BO_A$ may then facilitate an update of data associated with the secondary business object $BO_B$ and, when the update is completed, execute a database commit. According to some embodiments, the update of data associated with the secondary business object $BO_B$ and the database commit are associated with a single business process change transaction.

At S308, the secondary business object $BO_B$ detects that a database commit has been executed. For example, the secondary business object $BO_B$ may recognize that the primary business object $BO_A$ has copied information from server memory to a server storage device. At S310, the secondary business object $BO_B$, may remove, responsive to the detecting at S308, the lock associated with the secondary business object $BO_B$.

Note that some business objects may still receive a traditional "hard lock" that must be removed by the primary business object (such as those illustrated by solid lines in FIG. 2). For example, the primary business object $BO_A$ might determine that another business object $BO_C$ of the secondary business objects is to be associated with such a hard lock. In this case, the primary business object $BO_A$ may place a hard lock on the secondary business object $BO_C$ and facilitate an update of data associated with the secondary business object $BO_C$. When the transaction is complete, the primary business object $BO_A$ may execute a database commit and then remove the lock associated with the secondary business object $BO_C$.

Figure 4:
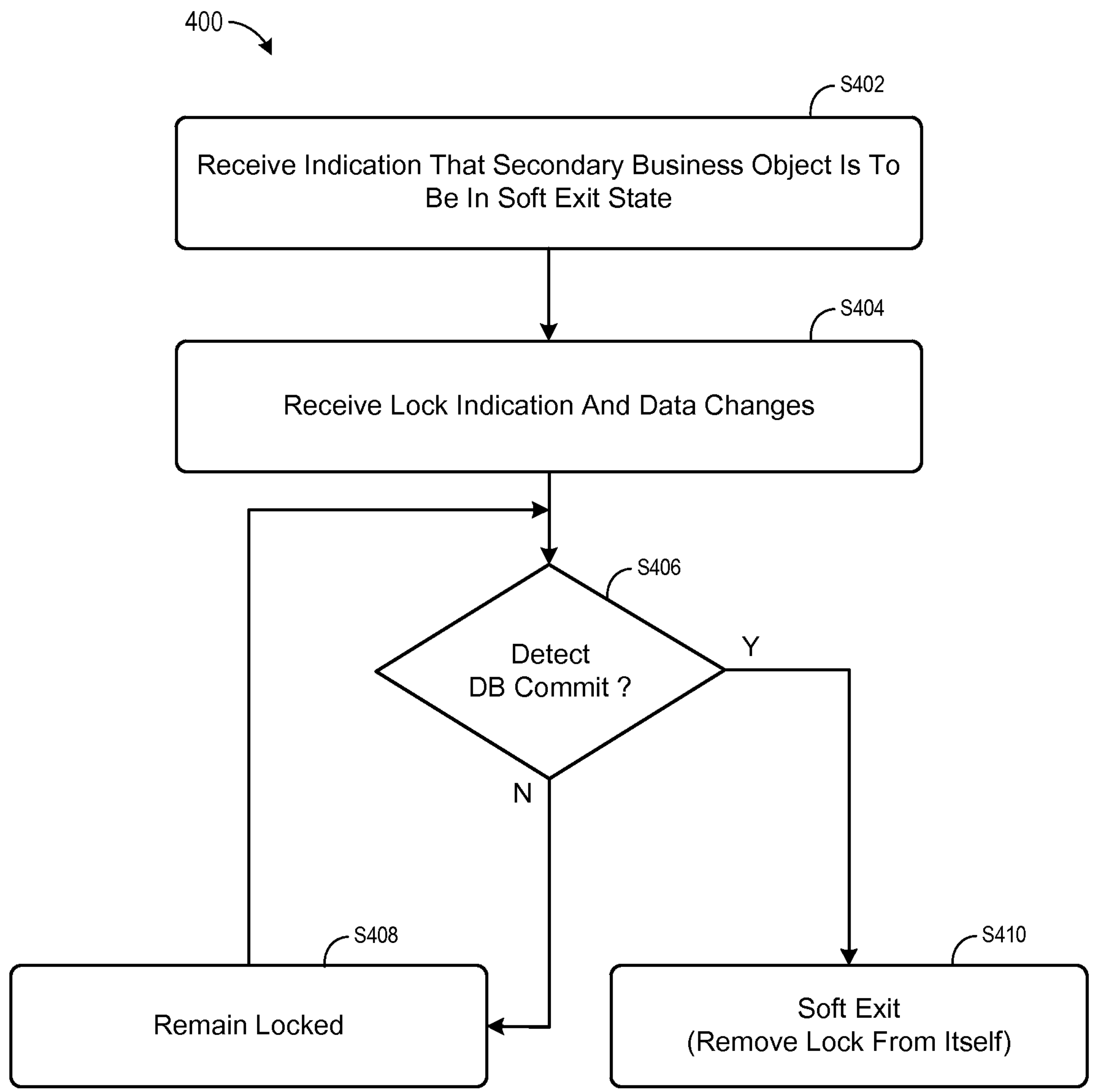
FIG. 4 is a flow diagram of a process that might be performed for a secondary business object in accordance with some embodiments.

FIG. 4 is a flow diagram of process 400 that might be performed for a secondary business object in accordance with some embodiments. At S402, the secondary business object may receive an indication that the secondary business object is to be in a soft exit state. The indication might be received, for example, from a primary business object. According to some embodiments, the indication is associated with a particular lock or a particular period of time (e.g., the secondary business object should enter a soft exit state when the next lock is applied and then revert to normal operation after the lock is removed). According to other embodiments, a single indication may be associated with multiple locks (e.g., a particular secondary business object might be hard coded to always be in a soft exit state when locked).

At S404, the secondary business object may receive a lock indication and data associated with the secondary business object might be updated by the party that issued the lock indication (e.g., a parent business object). At S406, the secondary business object enters the soft exit state waiting to detect an occurrence of a database commit. If no database commit is detected at S406, the secondary business object remains locked at S408. When a database commit is detected at S406, the soft exit is performed and the secondary business object removes the lock from itself at S410.

Figure 5:
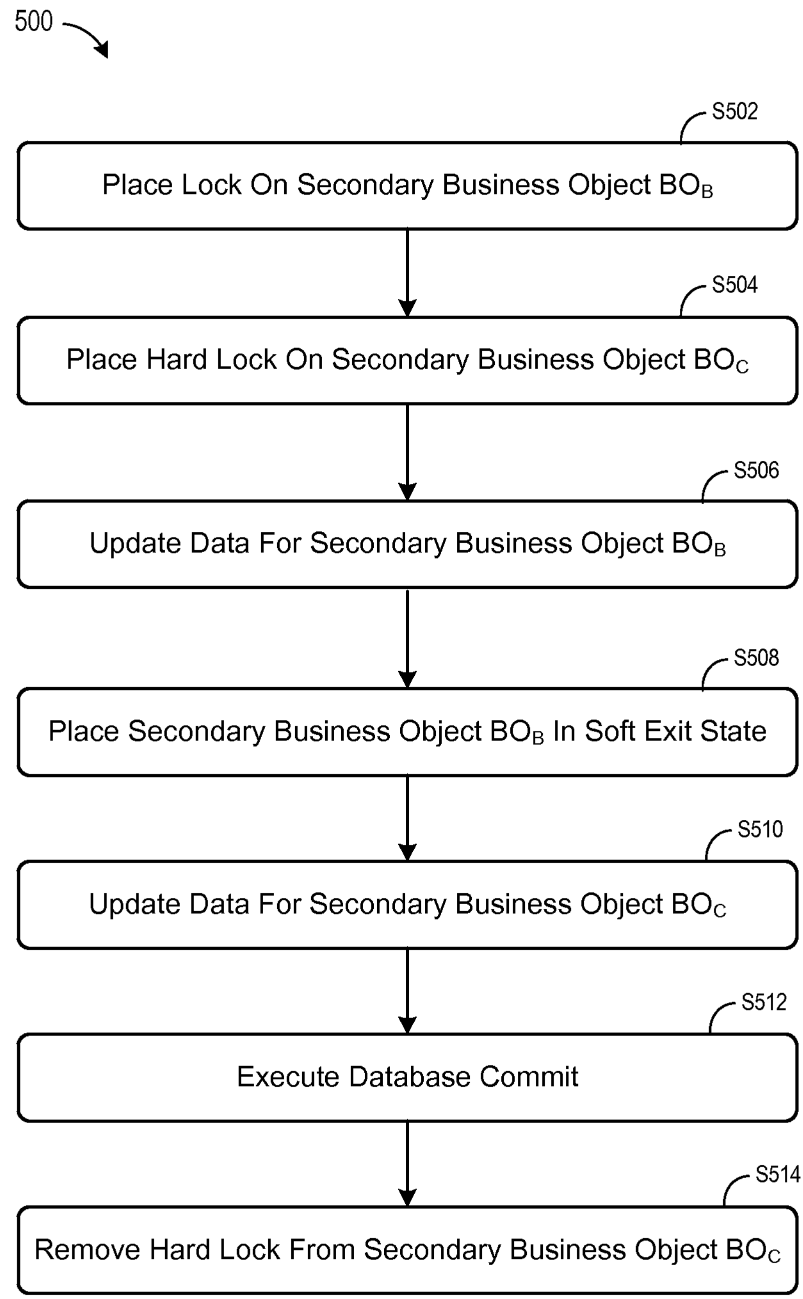
FIG. 5 is a flow diagram of a process that might be performed for a primary business object in accordance with some embodiments.

FIG. 5 is a flow diagram of a process 500 that might be performed for a primary business object in accordance with some embodiments. At S502, the primary business object ($BO_A$) places a lock on a secondary business object ($BO_B$). At S504, the primary business object ($BO_A$) places a hard lock on another secondary business object ($BO_C$). That is, this secondary business object $BO_C$ should not enter a soft exit state.

At S506, the primary business object $BO_A$ updates data for business object $BO_B$. At S508, the primary business object $BO_A$ indicates that the secondary business object $BO_B$ should enter a soft exit state. At S510, the primary business object $BO_A$ updates data for business object $BO_C$. For example, the primary $BO_A$ might update sales data included within those secondary business objects. At S512, the primary business object $BO_A$ executes a database commit when the transaction is completed. At S514, the primary business object $BO_A$ removes the hard lock from the secondary business object $BO_C$. Note that the primary business object $BO_A$ does not need to remove the lock from the other secondary business object $BO_B$ (because $BO_B$ will remove its own lock when it detects the database commit performed at S512).

Figure 6:
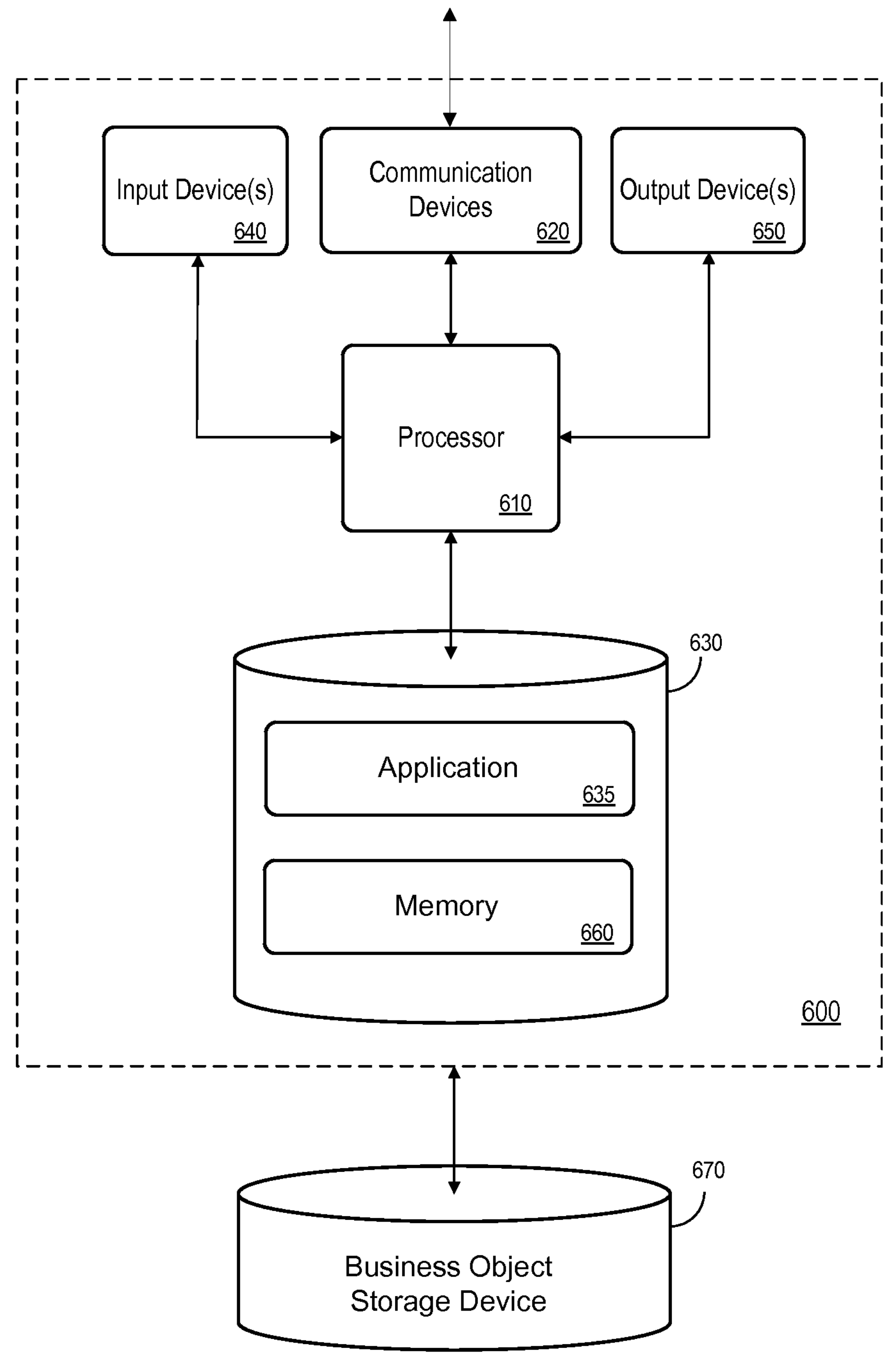
FIG. 6 is a block diagram of a system in accordance with some embodiments.

The processes described herein with respect to FIGS. 3 through 5 may be executed by any number of different hardware systems and arrangements. For example, FIG. 6 is a block diagram of a platform or system 600 in accordance with some embodiments. The platform 600 may include a server processor 610, such as one or more Central Processing Units ("CPUs"), coupled to communication devices 620 configured to communicate with remote devices (not shown in FIG. 6). The communication devices 620 may be used, for example, to exchange business information with remote devices. The server processor 610 is also in communication with an input device 640. The input device 640 may comprise, for example, a keyboard, computer mouse, and/or a computer media reader. Such an input device 640 may be used, for example, to receive business information from a user. The server processor 610 is also in communication with an output device 650. The output device 650 may comprise, for example, a display screen or printer. Such an output device 650 may be used, for example, to provide business information to a user.

The server processor 610 is also in communication with a storage device 630. The storage device 630 may comprise any appropriate information storage device, including combinations of magnetic storage devices (e.g., hard disk drives), optical storage devices, and/or semiconductor memory 660. The storage devices may have different access patterns, such as Random Access Memory (RAM) devices, Read Only Memory (ROM) devices and combined RAM/ROM devices. The system 600 may be coupled to a business object storage device 670. The business object storage device 670 may, according to some embodiments, store non-transitory database tables associated with primary and/or secondary business objects.

As used herein, information may be "received" by or "transmitted" to, for example: (i) the system 600 from other devices; or (ii) a software application or module within the system 600 from another software application, module, or any other source.

The storage device 630 stores an application 635 for controlling the server processor 610. The server processor 610 performs instructions of the application 635, and thereby operates in accordance any embodiments of the present invention described herein. For example, the server processor 610 may establish a primary business object $BO_A$ along with a plurality of secondary business objects that depend from the primary business object $BO_A$ in a hierarchy. The server processor 610 may also arrange for the primary business object $BO_A$ to place a lock on a secondary business object $BO_B$ and facilitate an update of data associated with the secondary business object $BO_B$. The secondary business object $BO_B$ may detect that a database commit has been executed, and responsive to that detection, remove the lock associated with the secondary business object $BO_B$.

In this way, efficient systems and methods may be provided in connection with business object locks. Moreover, the logic required to be performed for a primary business object may be reduced without having secondary business objects remained locked unnecessarily.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, not that any number of other configurations may be provided in accordance with embodiments of the present invention (e.g., some of the information associated with the databases described herein may be combined or stored in external systems). Moreover, although examples of specific types of business objects have been described, embodiments of the present invention could be used with other types of databases and/or database tables.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A method implemented by a computing system in response to execution of program code by a processor of the computing system, the method comprising:

establishing, in a storage device in communication with the processor, a primary business object along with a plurality of secondary business objects that depend from the primary business object in a hierarchy;

placing, by the primary business object under control of the processor, a lock on a secondary business object and facilitating an update of data associated with the secondary business object;

detecting, by the secondary business object under control of the processor, that a database commit has been executed; and responsive to said detecting, removing, by the secondary business object, the lock associated with the secondary business object.

2. The method of claim 1, further comprising:

determining, by the primary business object, that the secondary business object is to be associated with a soft exit state, wherein the secondary business object is only to remove the lock, responsive to said detecting, when in the soft exit state.

3. The method of claim 1, further comprising:

determining, by the primary business object, that an additional business object of the secondary business objects is to be associated with a hard lock;

placing, by the primary business object, a hard lock on the additional secondary business object and facilitating an update of data associated with the additional secondary business object;

executing, by the primary business object, a database commit; and removing, by the primary business object, the lock associated with the additional secondary business object.

4. The method of claim 1, wherein the database commit is associated with a copying of information from a server memory to a storage device.

5. The method of claim 4, wherein the update of data associated with the secondary business object and the database commit are associated with a single business process change transaction.

6. The method of claim 1, wherein the hierarchy is associated with line items between the primary business object and the secondary business objects.

7. The method of claim 1, wherein a single secondary business object may be associated with several primary business objects.

8. A non-transitory, computer-readable medium storing program code executable by a computer to perform a method, said method comprising:

establishing a primary business object along with a plurality of secondary business objects that depend from the primary business object in a hierarchy;

placing, by the primary business object, a lock on a secondary business object and facilitating an update of data associated with the secondary business object;

detecting, by the secondary business object, that a database commit has been executed; and responsive to said detecting, removing, by the secondary business object, the lock associated with the secondary business object.

9. The medium of claim 8, wherein the method further comprises:

determining, by the primary business object, that the secondary business object is to be associated with a soft exit state, wherein the secondary business object is only to remove the lock, responsive to said detecting, when in the soft exit state.

10. The medium of claim 8, wherein the method further comprises:

determining, by the primary business object, that an additional business object of the secondary business objects is to be associated with a hard lock;

placing, by the primary business object, a hard lock on the additional secondary business object and facilitating an update of data associated with the additional secondary business object;

executing, by the primary business object, a database commit; and removing, by the primary business object, the lock associated with the additional secondary business object.

11. The medium of claim 8, wherein the database commit is associated with a copying of information from a server memory to a storage device.

12. The medium of claim 11, wherein the update of data associated with the secondary business object and the database commit are associated with a single business process change transaction.

13. The medium of claim 8, wherein the hierarchy is associated with line items between the primary business object and the secondary business objects.

14. The medium of claim 8, wherein a single secondary business object may be associated with several primary business objects.

15. A system, comprising:

a server memory unit;

a storage device; and a server processor coupled to the server memory unit and to the storage device, wherein the server processor is to:

establish a primary business object along with a plurality of secondary business objects that depend from the primary business object in a hierarchy;

place, by the primary business object, a lock on a secondary business object and facilitate an update of data associated with the secondary business object;

detect, by the secondary business object, that a database commit has been executed; and responsive to said detecting, remove, by the secondary business object, the lock associated with the secondary business object.

16. The system of claim 15, wherein the server processor is further to:

determine, by the primary business object, that the secondary business object is to be associated with a soft exit state, wherein the secondary business object is only to remove the lock, responsive to said detecting, when in the soft exit state.

17. The system of claim 15, wherein the server processor is further to:

determine, by the primary business object, that an additional business object of the secondary business objects is to be associated with a hard lock;

place, by the primary business object, a hard lock on the additional secondary business object and facilitate an update of data associated with the additional secondary business object;

execute, by the primary business object, a database commit; and remove, by the primary business object, the lock associated with the secondary business object.

18. The system of claim 15, wherein the database commit is associated with a copying of information from the server memory unit to the storage device.

19. The system of claim 18, wherein the update of data associated with the secondary business object and the database commit are associated with a single business process change transaction.

20. The system of claim 15, wherein the hierarchy is associated with line items between the primary business object and the secondary business objects.

21. The system of claim 15, wherein a single secondary business object may be associated with several primary business objects.

* * * * *